United States Patent [19]
Teng et al.

[11] 3,960,514

[45] June 1, 1976

[54] SYNERGISTIC ORGANIC SOLVENT GELLANT

[75] Inventors: James Teng, St. Louis County; Marcella C. Stubits, St. Louis, both of Mo.

[73] Assignee: Anheuser-Busch, Incorporated, St. Louis, Mo.

[22] Filed: Apr. 1, 1974

[21] Appl. No.: 456,795

[52] U.S. Cl. ................................ 44/7 B; 44/7 E; 252/316
[51] Int. Cl.² ...................... C10L 7/00; B01J 13/00
[58] Field of Search .............. 252/316; 44/7 C, 7 E, 44/7 D, 7 B

[56] References Cited
UNITED STATES PATENTS

| | | | |
|---|---|---|---|
| 3,639,108 | 2/1972 | Finkelstein et al. | 44/7 E |
| 3,658,491 | 4/1972 | Canterino | 44/7 E |
| 3,679,382 | 7/1972 | Cohrs et al. | 252/316 X |
| 3,730,693 | 5/1973 | Teng et al. | 252/316 X |
| 3,824,085 | 7/1974 | Teng et al. | 44/7 C |
| 3,849,081 | 11/1974 | Snyder et al. | 44/7 E |

*Primary Examiner*—Benjamin R. Padgett
*Assistant Examiner*—Christine M. Nucker
*Attorney, Agent, or Firm*—Gravely, Lieder & Woodruff

[57] ABSTRACT

This disclosure covers a lipophilic polymeric carbohydrate derivative organic solvent gellant with a D.S. of about 2 to about 3 in combination with a synergistic additive which greatly increases the viscosity of the hydrocarbon solvent gel. This synergistic effect has been demonstrated in aromatic, chlorinated, and mixed hydrocarbon solvents, as well as in jet fuel. The high-viscosity gelled jet fuel is helpful in avoiding fires in aircraft accidents.

15 Claims, 1 Drawing Figure

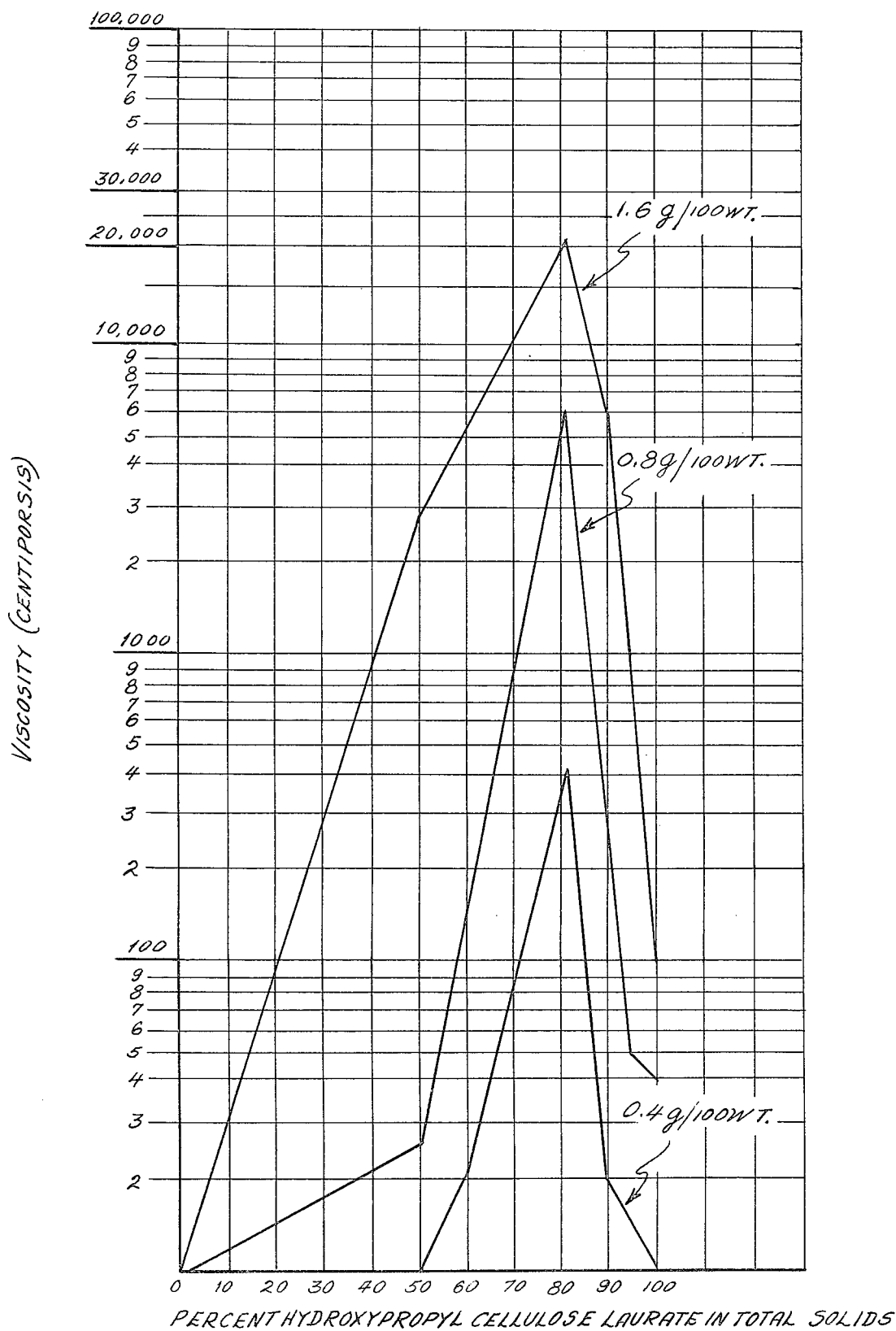

SYNERGISTIC ORGANIC SOLVENT GELLANT

BACKGROUND OF THE INVENTION

Fire and smoke inhalation cause many deaths in otherwise survivable aircraft accidents. Investigations indicate that fires usually are caused when the highly volatile fuel spills from damaged tanks and splatters throughout the wreckage. Fuel vaporizes and is easily ignited by hot engine parts or sparks from metal impact. Preliminary studies have demonstrated that gelled fuels are less likely to explode or burst into flames under aircraft crash conditions, and thus gelled fuels are a safety factor in jet aircraft.

In application Ser. No. 222,600, now U.S. Pat. No. 3824085, assignee of the present invention, there is disclosed a cellulose derivative and a set of processing conditions to product gelled or thickened jet fuel. Gelation or thickening is achieved by the fact that particles of dissolved polymers of carbohydrate derivatives can agglomerate to form a coherent structure and trap the fuel within the gel matrix. The gelling agent referred to in application Ser. No. 222,660 is hydroxypropyl cellulose laurate with a degree of molecular substitution of hydroxypropyl groups of 2 to 6, preferably 3 to 4, and a degree of substitution of laurate groups of 2 to 3.

Although the product and process of said application are quite satisfactory, it would be a substantial improvement if the viscosity of the gelled jet fuel could be increased without an increase in the total solid content of the gel. The process of the present invention increases the viscosity of the fuel gel of U.S. application Ser. No. 222,660 using hydroxypropyl cellulose laurate as the gelling agent one hundred fold.

Thus, one of the principal objects of the present invention is to provide a hydrocarbon or nonpolar solvent gelled or thickened with a lipophilic polymer carbohydrate derivative and synergistic additive. Another principal object of this invention is to provide a gelled jet fuel having incorporated therein hydroxypropyl cellulose laurate and a synergistic additive to provide for an unexpectedly high viscosity.

SUMMARY OF THE INVENTION

The present invention comprises a gelled or thickened hydrocarbon product comprising fluid hydrocarbon and particles of lipophilic polymeric carbohydrate derivative, namely hydroxypropyl cellulose laurate with an additive which synergistically effects the viscosity of the gel. This invention further comprises a process of making said product.

DETAILED DESCRIPTION

In the present invention, a lipophilic polymeric carbohydrate derivative, preferably hydroxypropyl cellulose laurate, is used with a hydrocarbon, preferably jet fuel, in combination with an elastic, high molecular weight synthetic polymer. The interaction of the polymer, generally known as an elastomer, with the hydroxypropyl cellulose laurate in gelling jet fuel brings about synergistic effects in the viscosity of the gel. The viscosity increases one hundred fold by the addition of 1 part elastomer per 10 parts hydroxypropyl cellulose laurate in comparison to the viscosity of the fuel gel prepared without the elastomer.

The hydroxypropyl cellulose laurate has a percentage of substitution of 65 to 100 percent, preferably 67 to 97 percent. That means on the average, 67 to 97 percent of the theoretically available hydroxyl functions per monosaccharide unit are substituted with lipophilic groups. This is equal to a degree of substitution (D.S.) of about 2 to about 3. The substitution must be carried out to the extent that the polymeric carbohydrate derivative acquires sufficient affinity for the fuel to permit solvation and dispersion.

The preferred synthetic elastomer used in this invention is a styrene-butadiene rubber sold under the name Ameripol Rubber 1509 by the B. F. Goodrich Company. Another synthetic rubber which may be used is sold under the name Polybutadiene Cis-4 by the Phillips Petroleum Company.

Their properties as provided by the respective manufacturers are listed in the following Table A.

TABLE A

| CHEMICAL | AMERIPOL Properties | Specification Values | | Test Method ASTM D 1416 |
|---|---|---|---|---|
| | | Minimum | Maximum | Section |
| Bound styrene,% | | 22.5 | 24.5 | 25–29 |
| Volatile matter,% | | — | 1.00 | 3–6 |
| Ash,% | | — | 1.25 | 11–15 |
| Organic acid,% | | 3.75 | 7.00 | 30–35 |
| Soap,% | | — | 0.10 | 36–40 |

| PHYSICAL | Cure Minutes at 293°F. | Specification Values | | Typical Properties | Test Method ASTM |
|---|---|---|---|---|---|
| | | Minimum | Maximum | | |
| Mooney viscosity, ML-4,212°F. | — | 27 | 37 | 31 | D 1646 |
| Compound Mooney, ML-4,212°F. | — | — | 58 | 50 | D 1646 |
| Tensile strength, psi | 50 | 3100 | — | 3900 | D 412 |
| Elongation,% | 50 | 600 | — | 660 | D 412 |
| Modulus at 300% elongation, psi | 25 | 350 | 750 | 650 | D 412 |
| | 50 | 800 | 1200 | 1050 | D 412 |
| | 100 | 1050 | 1450 | 1250 | D 412 |

| RAW PROPERTIES | CIS-4 Cis-4 1203 | COMPOUNDED PROPERTIES | | Minutes Cure at 293°F. |
|---|---|---|---|---|
| Volatile matter,% Max. | 0.75 | ML4 at 212°F., Max. | — | 75 |
| Ash, % Max. | 0.75 | Tensile strength, psi min. | 50 | 2100 |
| Organic Acid, % Max. | 2.0 | Elongation, % Min. | 50 | 375 |

TABLE A-continued

| | | AMERIPOL Properties | | |
|---|---|---|---|---|
| Gel, Max. | 3.0 | 300% Modulus, psi | 25 | 900± 250 |
| Soap, % Max. | — | | 35 | 1150± 250 |
| ML4 at 212°F. | 45±5 | | 50 | 1200± 250 |
| Oil, % Added | — | | | |

The liquids which are gelled include liquid hydrocarbons and non-polar solvents, specifically jet fuel. Other suitable solvents and hydrocarbons which can be used in the process of this invention are aromatics, chlorinated (such as chloroform), and mixed solvents, specifically acetone, hexane and toluene.

The amount of hydroxypropyl cellulose laurate utilized in the practice of this invention is at least 50 to about 95 percent based on the weight of the solids in the total elastomer blend. Preferably about 75 to about 90 percent by weight is used.

The elastomer content is about 50 to about 5 percent based on the weight of the total solids in the gelling agent, preferably about 25 to about 10 percent by weight.

Physical blending is the preferred method of mixing to provide a balanced viscoelastic effect with the elastomer and hydroxypropyl cellulose laurate. Initially the hydroxypropyl cellulose laurate is soaked for about 1 to about 24 hours in the hydrocarbon, then homogenized to form a smooth gel or solution. The time of mixing is between 5 to about 30 minutes or longer, depending on the intensity of agitation and the degree of swelling before homogenization. The temperature of the hydrocarbon during mixing is between about 25°C. and about 45°C. About 0.3 to about 1.5 grams hydroxypropyl cellulose laurate per 100 ml. of fluid can be used.

The elastomer is soaked for about 1 to about 24 hours in the hydrocarbon and then homogenized for about 15 minutes. About 0.08 to about 0.8 grams elastomer per 100 ml. of fluid can be used. The temperature of the elastomer during mixing is between about 25°C. and about 35°C. The elastomer blend is then added to the hydroxypropyl cellulose laurate and mixed for 5 to about 10 minutes with an ordinary electric mixer and at 25°C. to about 35°C.

The hydroxypropyl cellulose laurate and the elastomer are soaked in fuel prior to blending to condition them for dispersion in the final blend. Both the hydroxypropyl cellulose laurate and the elastomer are tough elastic gums. When soaked in fuel for several hours they absorb the fuel, swell and soften. Thus, less time and intensity of agitation is required for the dispersion and dissolution of the hydroxypropyl cellulose laurate and elastomer in the final blend.

After mixing, the hydroxypropyl cellulose laurate elastomer hydrocarbon mixture is allowed to stand for about 1 to about 4 hours to complete gelation or thickening.

The final gel has a specific gravity which is substantially that of the solvent being gelled. In the case of jet fuel, the specific gravity is between about 0.79 to about 0.81, preferably 0.80. The viscosity of the gel is between about 100 to about 24,000 centipoise.

EXAMPLE NO. 1

The following procedure is used to evaluate the selected synergistic elastomer additives in an aliphatic hydrocarbon.

Three individual jet fuel-polymer concentrates are prepared by soaking each polymer overnight in Jet A fuel. Each polymer gel or solution is then homogenized in a Waring Blender for 15 minutes at room temperature. The following list shows the jet fuel-polymer concentrations.

1. Hydroxypropyl cellulose laurate gel: 1.5 g./100 ml. Jet A fuel
2. Ameripol Rubber 1509: 5 g./100 ml. Jet A fuel
3. Polybutadiene Cis-4: 5 g./100 ml. Jet A fuel Individual 100 ml. hydroxypropyl cellulose laurate-elastomer blends are prepared in which each blend has a total solid content of 0.75 g. per 100 ml. Jet A fuel. All blends are prepared by adding an aliquot of the elastomer solution to the laurate gel and stirring for 5 minutes with a simple electric mixer. Additional fuel is added as needed to adjust the final concentration to 0.75 g./100 ml. fuel. Synergism is immediately apparent in each blend.

A Brookfield RVT viscometer is used to measure the viscosity of the gels. Results are shown in Tables I and II.

TABLE I

| Hydroxypropyl Cellulose Laurate (D.S. 2.90) | Ameripol Rubber 1509 | Blend Total Solids | Viscosity 10 rpm 25°C. |
|---|---|---|---|
| g./100 ml. | g./100 ml. | g./100 ml. | cps |
| 0.75 | 0 | 0.75 | 90 |
| 0 | 0.75 | 0.75 | 10 |
| 0.70 | 0.05 | 0.75 | 2,000 |

TABLE II

| Hydroxypropyl Cellulose Laurate (D.S. 2.90) | Polybutadiene Cis-4 | Blend Total Solids | Viscosity 10 rpm 25°C. |
|---|---|---|---|
| g./100 ml. | g./100 ml. | g./100 ml. | cps |
| 0.75 | 0 | 0.75 | 90 |
| 0 | 0.75 | 0.75 | 10 |
| 0.70 | 0.05 | 0.75 | 14,000 |

These hydroxypropyl cellulose laurate-elastomer blends show a marked synergistic effect with over a 100-fold increase in Brookfield viscosity.

EXAMPLE NO. 2

This example shows the synergistic effect of the selected elastomers on hydroxypropyl cellulose laurate gel in a mixed solvent. The composition of the mixed solvent is as follows:

| Acetone | 30 parts |
| Hexane | 60 parts |
| Toluene | 10 parts |

Ten grams of each individual polymer Butadiene Cis-4 and Ameripol Rubber are soaked in 50 ml. toluene for 6 hours, then homogenized in a Waring Blender for 15 minutes. About 300 ml. hexane, and 150 ml. acetone are added to each. Each mixture is then cooled to 4°C. in an ice bath and homogenized for 5 minutes. An aliquot of the elastomer solution is added to the hydroxypropyl cellulose laurate gel. The mixed solvent is added so that the total solid content of each blend is 1.6 g./100 ml. The blend is stirred for 5 minutes with a simple electric mixer. A Brookfield RVT viscometer with a No. 3 and No. 6 spindle is used to measure the viscosity of the gel.

Results are shown in Tables III and IV.

TABLE III

| Hydroxypropyl Cellulose Laurate (D.S. 2.95) | Poly-butadiene Cis-4 | Blend Total Solids | Viscosity 10 rpm 25°C. |
| --- | --- | --- | --- |
| g./100 ml. | g./100 ml. | g./100 ml. | cps |
| 1.6 | 0 | 1.6 | 225 |
| 0 | 1.6 | 1.6 | 10 |
| 1.4 | 0.2 | 1.6 | 14,000 |

TABLE IV

| Hydroxypropyl Cellulose Laurate (D.S. 2.95) | Ameripol Rubber 1509 | Blend Total Solids | Viscosity 10 rpm 25°C. |
| --- | --- | --- | --- |
| g./100 ml. | g./100 ml. | g./100 ml. | cps |
| 1.6 | 0 | 1.6 | 225 |
| 0 | 1.6 | 1.6 | 10 |
| 1.4 | 0.2 | 1.6 | 12,000 |

EXAMPLE NO. 3

This example shows the synergistic effect of Ameripol Rubber 1509 and Polybutadiene Cis-4, when blended with hydroxypropyl cellulose laurate gel in an aromatic hydrocarbon.

Ten grams of each individual polymer are soaked overnight in 500 ml. toluene and homogenized for 15 minutes. An aliquot of the elastomer solution is added to the hydroxypropyl cellulose laurate gel; the final total solid concentration is adjusted to 1.6 g./100 ml. with toluene, and the blend stirred for 10 minutes with a simple electric mixer. The viscosity of each sample is determined after one hour with a Brookfield RVT viscometer. Results are shown in Table V.

TABLE V

| Hydroxypropyl Cellulose Laurate (D.S. 2.98) | Ameripol Rubber 1509 | Poly-butadiene Cis-4 | Viscosity 10 rpm 25°C. |
| --- | --- | --- | --- |
| g./100 ml. | g./100 ml. | g./100 ml. | cps |
| 1.6 | 0 | 0 | 1,450 |
| 1.3 | 0.3 | 0 | 29,000 |
| 1.3 | 0 | 0.3 | 24,000 |
| 0 | 1.6 | 0 | 10 |
| 0 | 0 | 1.6 | 10 |

EXAMPLE NO. 4

This example shows the synergistic effect of Ameripol Rubber 1509 and Polybutadiene Cis-4 when a chlorinated hydrocarbon is used as a solvent. Ten grams of each individual polymer are soaked overnight in 500 ml. chloroform, cooled in an ice bath and homogenized for 10 minutes. An aliquot of the elastomer solution is added to the hydroxypropyl cellulose gel, and the total solid concentration of each sample adjusted to 1.6 g./100 ml. with chloroform. The blend is stirred for 10 minutes with a simple electric mixer and allowed to stand for two hours before viscosity measurement with a Brookfield RVT viscometer.

Results are shown in Table VI.

TABLE VI

| Hydroxypropyl Cellulose Laurate (D.S. 2.95) | Ameripol Rubber 1509 | Poly-butadiene Cis-4 | Viscosity 10 rpm 25°C. |
| --- | --- | --- | --- |
| g./100 ml. | g./100 ml. | g./100 ml. | cps |
| 1.6 | 0 | 0 | 6,150 |
| 1.3 | 0.3 | 0 | 24,500 |
| 1.3 | 0 | 0.3 | 13,000 |
| 0 | 1.6 | 0 | 10 |
| 0 | 0 | 1.6 | 10 |

EXAMPLE NO. 5

This example shows the maximum synergistic hydroxypropyl cellulose laurate-elastomer ratio at several different total concentrations in Jet A fuel. The elastomer used in this example is Ameripol Rubber 1509. The D.S. of the hydroxypropyl cellulose laurate is 2.95.

About 40 grams of hydroxypropyl cellulose laurate are soaked for 24 hours in 400 ml. Jet A fuel, homogenized in a Lourdes homogenizer for 30 minutes and diluted to a total volume of 2500 ml. with Jet A fuel.

About 25 grams of Ameripol Rubber 1509 are soaked for 24 hours in 1000 ml. Jet A fuel and homogenized for 15 minutes.

The elastomer solution is blended with the hydroxypropyl cellulose laurate gel in ten different ratios, in three different total solid concentrations. The total solids concentrations are 1.6, 0.8 and 0.4 grams per 100 ml. A Brookfield RVT viscometer is used to measure viscosities at 10 rpm, 25°C. The points of peak synergism are compared in Graph I. This ratio is shown to be constant, and does not depend on the total solid concentration in the fuel.

This invention is intended to cover all changes and modifications of the examples of the invention herein chosen for purposes of the disclosure which do not constitute departures from the spirit and scope of the invention.

What is claimed is:

1. A gelled hydrocarbon or non-polar solvent comprising an amount of hydroxypropyl cellulose laurate sufficient to gel said hydrocarbon or non-polar solvent, said hydroxypropyl cellulose laurate having a degree of molecular substitution of hydroxypropyl groups of 2–6 and a degree of substitution of laurate groups between about 2 and 3 and an amount of an additive to synergistically affect the viscosity of the gel, said additive being an elastomer of the polybutadiene or butadiene-styrene copolymer type.

2. The product of claim 1 wherein the hydrocarbon is jet-type fuel, aromatic, chlorinated, or mixed hydrocarbon solvents.

3. The product of claim 1 wherein there is about 0.3 to about 1.5 grams hydroxypropyl cellulose laurate per 100 ml. of hydrocarbon or non-polar solvent.

4. The product of claim 1 wherein there is about 0.08 to about 0.8 grams elastomer additive per 100 ml. of hydrocarbon or non-polar solvent.

5. The product of claim 1 having a viscosity of about 170 to about 24,000 cp.

6. The product of claim 1 having a specific gravity of about 0.79 to about 0.81.

7. The product of claim 1 wherein the hydrocarbon is jet-type fuel, the synergistic additive is styrenebutadiene rubber there being about 0.3 to about 1.5 grams hydroxypropyl cellulose laurate per 100 ml. of jet-type fuel with about 0.08 to about 0.8 grams elastomer per 100 ml. of jet-type fuel and the gel having a specific gravity of about 0.80 with a viscosity of 170 to about 24,000 cp.

8. A process of gelling a fluid selected from the group of hydrocarbon or non-polar solvent comprising soaking hydroxyproply cellulose laurate in a first portion of said fluid, homogenizing, soaking an elastomer selected from a group consisting of polybutadiene or butadiene-styrene copolymer in a second portion of said fluid, homogenizing, and subsequently blending both fluid portions.

9. The process of claim 8 wherein there is about 0.3 to about 1.5 grams of hydroxypropyl cellulose laurate per 100 ml. of fluid.

10. The process of claim 8 wherein there is about 0.08 to about 0.8 grams of elastomer per 100 ml. of fluid.

11. The process of claim 8 wherein the cellulose laurate is soaked in the fluid from about 1 to about 24 hours.

12. The process of claim 8 wherein the elastomer is soaked in the fluid for about 1 to about 24 hours.

13. The process of claim 8 wherein the final mixture is allowed to stand between about 1 to about 24 hours.

14. The process of claim 8 wherein the final mixture has a viscosity of about 170 to about 24,000 cp.

15. The process of claim 8 wherein the hydroxypropyl cellulose laurate has a degree of molecular substitution of hydroxypropyl groups of about 4 and a degree of substitution of laurate groups of about 2 to about 3.

* * * * *